United States Patent [19]
Kennedy et al.

[11] 3,907,932
[45] Sept. 23, 1975

[54] COLOR STABILIZATION OF NITRILE-CONTAINING POLYMERS WITH ORGANOTIN COMPOUNDS

[75] Inventors: Alice W. Kennedy, Northfield; Raymond S. Shank, Brecksville; Eddie Wardlow, Jr., Cleveland, all of Ohio

[73] Assignee: The Standard Oil Company, Cleveland, Ohio

[22] Filed: July 11, 1974

[21] Appl. No.: 487,466

[52] U.S. Cl. ........ 260/881; 260/45.75 T; 260/880 R
[51] Int. Cl.² .......................................... C08F 45/62
[58] Field of Search .......... 260/45.75 T, 880 R, 881

[56] References Cited
UNITED STATES PATENTS

| | | | |
|---|---|---|---|
| 2,789,107 | 4/1957 | Weinberg et al. | 260/45.75 |
| 2,841,569 | 7/1958 | Rugg et al. | 260/45.75 |
| 3,011,991 | 12/1961 | Anderson et al. | 260/45.75 |
| 3,368,916 | 2/1968 | Hattori | 260/45.75 |

OTHER PUBLICATIONS

S.C.I. Monographs, No. 13 (pp. 184 to 199) and No. 26 (pp. 236 to 247); published 1961 and 1967 respectively by the Society of Chemical Industry, London, England.

Primary Examiner—V. P. Hoke
Attorney, Agent, or Firm—John F. Jones; Sherman J. Kemmer; Evelyn R. Kosman

[57] ABSTRACT

A polymer composition containing a high proportionate amount of olefinic nitrile is stabilized against thermal discoloration by inclusion therein from about 0.05 to 2 parts by weight per hundred parts of resin of an organotin maleate compound selected from the group consisting of the hydrocarbon tin maleates and the hydrocarbon tin-bis-maleate half esters.

14 Claims, No Drawings

COLOR STABILIZATION OF NITRILE-CONTAINING POLYMERS WITH ORGANOTIN COMPOUNDS

The present invention relates to nitrile resins that are stabilized against discoloration generated by thermal degradation during processing. More particularly this invention relates to the stabilization of copolymers and graft copolymers containing a high proportionate amount of olefinic nitrile against thermal discoloration by inclusion into the polymer minor amounts of an organotin maleate compound.

The organotin maleate compounds found to be effective for stabilizing nitrile polymers are the hydrocarbon tin maleates having the empirical formula:

$$(R_2SnC_4H_2O_4)_x$$

wherein "$x$" is an integer of from 1 to 4, and "R" may be a hydrocarbon radical such as an alkyl group containing from 2 to 12 carbon atoms, and the hydrocarbon tin-bismaleate half esters having the empirical formula:

$$R_2Sn(C_4H_2O_4R')_2$$

and wherein R is defined as above and R' may be an alkyl group containing from 4 to 14 carbon atoms. Substituted aliphatic radicals are also contemplated to be within the scope of this invention. The organotin stabilizers of this invention are compatible with the nitrile resins, they do not impart any additional haze or reduce light transmission of the resin, nor do they have any adverse effects on the physical properties of the resins within the concentration ranges specified.

Although many organotin compounds are known to be effective color stabilizers for polyvinyl chloride resins, it is surprising that the compounds disclosed hereinabove are effective stabilizers for certain nitrile resins in view of the article published in the *Journal of Polymer Science*, Vol. 10, Part A-1 (1972) p. 3109, entitled "Coloration of PAN & PMAN by Organotin Compounds", which indicates that certain organic tin compounds, such as tributyltin methoxide, dibutyltin dimethoxide, and N-(tributyl stannyl) imidazole, act as destabilizers with respect to color in some nitrile resins. It is also more surprising that the compounds of the present invention are effective for certain nitrile resins in view of the fact that many of the known tin stabilizers for polyvinyl chloride resins are not only ineffective for but actually promote color formation in high nitrile resins, as will be demonstrated by the Examples given hereinbelow.

The organotin stabilizer compounds of this invention are effective at very low concentrations and they may be advantageously incorporated into the nitrile resins in concentrations ranging from about 0.05 to about 2 parts per hundred parts of resin, on a weight basis, and preferably in concentrations ranging from about 0.1 to about 1 part by weight per hundred parts of resin. Concentrations above about 1 part phr may create haze with some resins.

Additionally, it has been found that minor amounts of certain types of anti-oxidants are advantageously employed in combination with the organotin maleate stabilizers of the present invention, and a synergistic effect on color stability of the resin is observed with the use of anti-oxidants such as the alkylated phenols and bis-phenols, alkyl esters of thioacids, alkyl substituted phenyl phosphites and alkyl substituted phenyl phosphates. Particularly suitable are anti-oxidants such as: 2,6-ditertiary-butyl-p-cresol, dilauryl thiodipropionate, distearylthio-dipropionate, bis (mixed mono- and di-nonyl phenyl) phosphite, trisnonyl phenyl phosphate, and the like. Depending on the type of anti-oxidant being utilized, the anti-oxidant may be incorporated into the resin in amounts ranging from about 0.05 to 2 parts by weight per hundred parts of resin.

The additives of the present invention may be conveniently incorporated into the resin by dry blending with resin strands or powders, and the resulting blends can be pelletized and/or extruded into sheets or other shapes. The stabilizers may also be satisfactorily incorporated into a latex of the nitrile resin previous to the coagulation and subsequent processing by conventional techniques.

The nitrile polymers useful in this invention include those resinous polymers and interpolymers produced by polymerizing a major proportion of a monounsaturated nitrile, such as acrylonitrile, and a minor proportion of another monovinyl monomer component copolymerizable with said nitrile in an aqueous or an organic medium and optionally in the presence of a preformed diene rubber which may be a homopolymer or a copolymer of a conjugated diene monomer.

The conjugated diene monomers useful in the present invention include butadiene-1,3, isoprene, chloroprene, bromoprene, cyanoprene, 2,3-dimethyl-butadiene-1,3, 2-ethyl-butadiene-1,3, 2,3-diethyl butadiene-1,3, and the like, and others. Most preferred for the purpose of this invention are butadiene and isoprene because of their ready availability and their excellent copolymerization properties.

The olefinically unsaturated nitriles useful in the present invention are the alpha,beta-olefinically unsaturated mononitriles having the structure

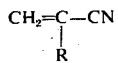

wherein R is hydrogen, a lower alkyl group having from 1 to 4 carbon atoms, or a halogen. Such compounds include acrylonitrile, alpha-chloroacrylonitrile, alpha-fluoroacrylonitrile, methacrylonitrile, ethacrylonitrile, and the like. The most preferred olefinically unsaturated nitriles in the present invention are acrylonitrile and methacrylonitrile and mixtures thereof.

The other monovinyl monomer component copolymerizable with the olefinically unsaturated nitriles which are useful in this invention includes one or more of the esters of olefinically unsaturated carboxylic acids, vinyl esters, vinyl ethers, alpha-olefins, vinyl aromatic monomers, and others.

The esters of olefinically unsaturated carboxylic acids include those having the structure

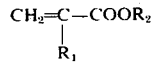

wherein $R_1$ is hydrogen, an alkyl group having from 1 to 4 carbon atoms, or a halogen, and $R_2$ is an alkyl group having from 1 to 6 carbon atoms. Compounds of this type include methyl acrylate, ethyl acrylate, the propyl acrylates, the butyl acrylates, the amyl acrylates, and the hexyl acrylates; methyl methacrylate, ethyl methacrylate, the propyl methacrylates, the butyl methacrylates, the amyl methacrylates, and the hexyl methacrylates; methyl alpha-chloroacrylate, ethyl alpha-chloroacrylate, and the like. Most preferred in the present invention are methyl acrylate, ethyl acrylate, methyl methacrylate, and ethyl methacrylate.

The alpha-olefins useful in the present invention are those having at least 4 and as many as 10 carbon atoms and having the structure

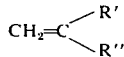

wherein R' and R'' are alkyl groups having from 1 to 7 carbon atoms, and more specifically preferred are alpha-olefins such as isobutylene, 2-methyl butene-1, 2-methyl pentene-1, 2-methyl hexene-1, 2-methyl heptene-1, 2-methyl octene-1, 2-ethyl butene-1, 2-propyl pentene-1, and the like. Most preferred is isobutylene.

The vinyl ethers include methyl vinyl ether, ethyl vinyl ether, the propyl vinyl ethers, the butyl vinyl ethers, methyl isopropenyl ether, ethyl isopropenyl ether, and the like. Most preferred are methyl vinyl ether, ethyl vinyl ether, the propyl vinyl ethers, and the butyl vinyl ethers.

The vinyl esters include vinyl acetate, vinyl propionate, the vinyl butyrates, and the like. Most preferred is vinyl acetate.

The vinyl aromatic monomers include styrene, alpha-methyl styrene, the vinyl toluenes, the vinyl xylenes, isopropyl styrene such as o-, m- and p-isopropyl styrene and the like and mixtures of the same. Most preferred is styrene.

some of the polymerizates of particular utility in this invention and details of their method of preparation are described in U.S. Pat. Nos. 3,426,102, 3,586,737 and 3,763,278.

The polymerizates useful in the process of this invention are those prepared by the polymerization of 100 parts by weight of (A) at least 50% by weight of at least one nitrile having the structure

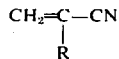

wherein R has the foregoing designation and (B) up to 50% by weight based on the combined weight of (A) and (B) of at least one member selected from the group consisting of (1) an ester having the structure

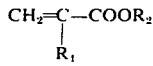

wherein $R_1$ and $R_2$ have the foregoing respective designations, (2) an alpha-olefin having the structure

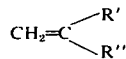

wherein R' and R'' have the foregoing respective designations, (3) a vinyl ether selected from the group consisting of methyl vinyl ether, ethyl vinyl ether, the propyl vinyl ethers, and the butyl vinyl ethers, (4) vinyl acetate, and (5) styrene, in the presence of from 0 to 40 parts by weight of (C) a rubbery polymer of a conjugated diene monomer selected from the group consisting of butadiene and isoprene and optionally a comonomer selected from the group consisting of styrene and a nitrile monomer having the structure

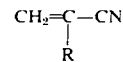

wherein R has the foregoing designation, said rubbery polymer containing from 50 to 100% by weight of polymerized conjugated diene and from 0 to 50% by weight of comonomer.

Preferably, component (A) should be present in amounts from about 70 to 90% by weight based on the combined weight of (A) and (B) and the rubbery polymer (C) should contain more than 50% by weight of conjugated diene and more preferably from 60% to 90% by weight of the conjugated diene.

The polymeric compositions of the present invention can be prepared by any of the known general techniques of polymerization including the bulk polymerization, solution polymerization and emulsion or suspension polymerization techniques, by batch, continuous or intermittent addition of the monomers and other components. The polymerization is preferably carried out in aqueous emulsion or suspension processes in the presence of an emulsifier, molecular weight modifier and a free-radical generating polymerization initiator at a temperature of from about 0° to 100°c in the substantial absence of molecular oxygen. It is also preferred that the monomers are copolymerized in the presence of an emulsion or a suspension of the preformed rubber. The product of the aqueous emulsion polymerization is usually a latex. The copolymers may be recovered from the latex by any suitable means such as by coagulation with electrolytes or solvents, by freezing, and the like.

The polymerizates useful in the process of this invention can contain compounding ingredients and additives, pigments, colorants, stabilizers, fillers, etc., as is well known in the art so long as the balance between impact strength, flexural strength, tensile strength, processability, heat distortion temperature, and the like is not affected to such a degree that the article is no longer useful for its intended purpose.

Polymeric products of the present invention are thermoplastic materials which can be thermoformed into a wide variety of useful articles in any of the conventional ways employed with known thermoplastic polymeric materials, such as by extrusion, milling, molding, drawing, blowing, and the like. These polymers have excellent solvent resistance and their impact strength and low permeability to gases and vapors make them very useful in the packaging industry, and they are particularly useful in the manufacture of bottles, film, and other types of containers for liquids and solids.

The following examples illustrate in greater detail the preferred mode of carrying out the present invention, and the amounts of ingredients in these examples are given in parts by weight unless otherwise indicated. It is to be understood, however, that the scope of this invention is not to be limited to these examples.

EXAMPLE A

A. Preparation of Elastomer

| Components | Parts by Weight |
| --- | --- |
| Water | 200 |
| Butadiene | 75 |
| Styrene | 25 |
| t-Dodecyl mercaptan | 0.7 |
| Ethylenediamine tetraacetic acid, tripotassium salt (Hampol K₃-120) | 0.1 |
| GAFAC RS-710[1] | 0.7 |
| Potassium Persulfate | 0.2 |
| Polydimethyl siloxane (50% solution) (Antifoam (DOW FG-10) | 0.01 |

[1]α-tridecyl-ω-hydroxypoly(oxyethylene) mixture of dihydrogen phosphate and monohydrogen phosphate esters having an acid number of 58 to 70, manufactured by GAF Corporation.

To 200 parts of water were added 0.7 parts of GAFAC RS-710 and 0.1 parts Hampol K₃-120. The ingredients were stirred until well dispersed, and the pH was adjusted to 6.7 with a 25% aqueous solution of KOH. 0.2 Parts of potassium persulfate were added to the reactor, along with 0.7 parts of t-dodecyl mercaptan dissolved in 25 parts of styrene. The reactor was purged with nitrogen, evacuated and 75.0 parts butadiene were added to the mixture. The reactor was slowly heated to 60°C, and the reaction was allowed to continue for 19 hours at which time the solids level of the latex reached 27.3% by weight. 0.01 Parts of DOW FG-10 antifoam agent were added to the reactor with the aid of nitrogen pressure. The reactor was slowly vented and vacuum stripping was begun while the temperature remained at 60°C. The unreacted monomers were removed over a period of 2 hours under a vacuum of 20 inches Hg. The reactor was brought to atmospheric pressure with nitrogen, and the latex was allowed to cool. The latex was then filtered through cheesecloth, and the final total solids of the filtered latex measured 29.0% by weight.

B. Preparation of Graft Polymer

| Components | Parts by Weight |
| --- | --- |
| Water | 250 (includes water in elastomer) |
| Acrylonitrile | 75.5 |
| Styrene | 24.5 |
| Pentaerythritol tetrakis mercaptopropionate (Evans Q-43) | 2.1 |
| Elastomer from Step A (29% T.S.) | 51.7 (15 parts rubber) |
| GAFAC RS-710 | 1.2 |
| Tridecyloxypoly (ethyleneoxy) ethanol (Emulphogene BC-420) | 0.8 |
| Citric Acid | 0.2 |
| 2,2' Azobis (α,γ-dimethyl valero-nitrile) (Vazo 52) | 0.165 |
| Bis-(mixed mono- and di-nonyl phenyl phosphite) (Naugard PHR) | .01 |
| Butylated hydroxytoluene (Naugard BHT) | .01 |

155 Parts of water in addition to the 37 parts of water present in the elastomer latex was charged to a reactor. To this was added with slow mixing a water-emulsifier solution containing 1.2 parts GAFAC RS-710, 0.8 parts Emulphogene BC-420 and 0.2 parts citric acid in 30 parts of water.

This was followed by the addition of 51.7 parts of the above elastomer and 8.25 parts of water with stirring. A mixture of 8.0 parts acrylonitrile and 2.0 parts of styrene were added continuously over a period of 25 to 30 minutes. Agitation was stopped, the contents of the vessel were allowed to stand for 2 hours, and the latex was then filtered through cheesecloth.

The rubber-monomer mixture prepared above was then added to a second reactor and the first container was then rinsed into the reactor with 20 parts of water. The reactor was purged with nitrogen while being heated to 65°C. 0.085 Parts Vazo 52 dissolved in 0.5 part acrylonitrile was then added to the reactor. The monomer addition of 67.5 parts of acrylonitrile, 22.5 parts styrene, 2.1 parts Evans Q-43, 0.01 parts Naugard PHR and 0.01 parts Naugard BHT was started immediately under nitrogen purge and was continued over a period of 4 hours and 20 minutes. 0.045 Parts Vazo 52 in 0.5 part acrylonitrile was added after 1½ hours and 0.035 parts in 0.5 parts acrylonitrile was added after 3½ hours. With each addition of the Vazo 52 solution, 0.5 part acrylonitrile was used as a rinse. Vacuum stripping was begun after 4 hours and 50 minutes of reaction time. The temperature was held at 65°C while the unreacted monomers were removed under a vacuum of 18 inches Hg. The total solids content of the resulting latex was 28.0%, by weight. The latex was coagulated in 1½ volumes of an aqueous solution of $Al_2(SO_4)_3 \cdot 18-H_2O$ containing 3 grams of the aluminum salt per hundred grams of resin solids, which had been heated to a temperature of 88°–90°C.

EXAMPLE B

| Components | Parts by Weight |
| --- | --- |
| Water | 225 |
| Acrylonitrile | 77 |
| Styrene | 23 |
| GAFAC RE-610[1] (emulsifier) | 1.35 |
| Pentaerythritol tatrakis mercaptopropionate (Carlisle Q-43) | 1.65 |
| 2,2'-Azo-bis (isobutyronitrile) (Vazo 64) | 0.16 |
| Butylated hydroxytoluene (Naugard BHT) | 0.01 |

[1]A mixture of $R-O-(CH_2CH_2O-)_nPO_3M_2$ and $[R-O-(CH_2CH_2O-)_n]_2 PO_2M$ wherein "n" is a number from 1 to 40 "R" is an alkyl or alkaryl group and M is hydrogen, ammonia or an alkali metal, produced by General Aniline & Film Corp.

195 Parts of water were charged to a reactor followed by the addition of 1.35 parts GAFAC RE-610. An additional 20 parts of water was utilized to rinse the GAFAC RE-610 into the reactor.

The reactor, containing the emulsifier solution, was purged with nitrogen and heated to 70°C. The precharge, consisting of 1.0 part styrene in 8.0 parts of acrylonitrile, was charged to the reactor followed by the addition of an additional 10 parts of water. After a period of 15 minutes, 0.1 parts of Vazo 64 in 0.5 part acrylonitrile was added to the reactor. An additional 0.5 parts of acrylonitrile was added to rinse the entrance port of the reactor. The remaining water (10 parts) was then added. Another 0.03 parts of Vazo 64 was added after a period of 1½ hours and 0.03 part after 3½ hours. A total of six portions of 0.5 parts of acrylonitrile, 0.5 parts as a solvent and 0.5 parts as a rinse were used each time the initiator was added.

The addition of the monomer-chain transfer solution prepared by adding 1.65 parts of Carlisle Q-43 to 66.0 parts acrylonitrile and 22.0 parts styrene was begun immediately, and pumping was conducted linearly over a period of 4 hours. The reaction was continued for an additional 45 minutes and was terminated by the addition of 0.01 part Naugard BHT. The temperature was held at 70°C while the unreacted monomers were removed under a vacuum of 20 inches Hg. The total solids content of the resulting latex was 29.5%. The latex was coagulated in 1½ volumes of water, heated to 88°–90°C and containing 3 grams $Al_2(SO_4)_3 \cdot 18H_2O$ per hundred grams of resin solids.

EXAMPLE C

| Components | Parts by Weight |
|---|---|
| Water | 156 |
| Acrylonitrile | 75 |
| Methyl Acrylate | 25 |
| GAFAC RE-610 (emulsifier) | 3.0 |
| Pentaerythritol tetrakis mercaptopropionate (Carlisle Q-43) | 1.27 |
| Potassium persulfate | 0.06 |
| Tetraethylenediamine tetraacetic acid, tetrapotassium salt (41% aqueous solution) Hampene $K_4100$ | 0.05 |

148 Parts of water were charged to a container. 0.3 Parts of GAFAC RE-610 were added with stirring. The pH of the mixture was adjusted to 5.1 with $NH_4OH$, and the solution was charged to the reactor along with 0.13 parts of Carlisle Q-43 dissolved in 7.5 parts acrylonitrile and 2.5 parts methyl acrylate. To this was added 0.05 parts Hampene $K_4100$ to complete the initial reactor charge.

The reactor and its contents were purged with nitrogen and sealed. The reactor was then heated to 68°C with stirring. When the temperature had leveled off at 68°C, a solution of 0.006 parts of $K_2S_2O_8$ in 1.48 parts of water was added under a nitrogen stream, then the addition of the two solutions, one consisting of 2.7 parts GAFAC RE-610 and 1.14 parts Carlisle Q-43 dissolved in a mixture of 67.5 parts of acrylonitrile and 22.5 parts of methyl acrylate, and the other consisting of 0.054 parts of $K_2S_2O_8$ in 7.4 parts of water, was begun. Both solutions were pumped in linearly over a 6-hour period. The total reaction time was 8¼ hours. The final solids content in the latex was 36.5%. The unreacted monomers were removed by vacuum stripping under a pressure of 20 inches Hg for 2 hours at 68°C. The latex was coagulated in 1½ volumes of water containing 3 grams of $Al_2(SO_4)_3 \cdot 18H_2O$ per hundred grams of resin solids. The coagulation was conducted at 71°C.

EXAMPLE D

A. Preparation of Elastomer

An elastomer was prepared by reacting the following ingredients for 9 hours at 53°C in a nitrogen atmosphere:

| Components | Parts by Weight |
|---|---|
| Butadiene | 70 |
| Acrylonitrile | 30 |
| t-Dodecyl mercaptan | 0.71 |
| P & G soap Flakes | 1.4 |
| Azo-bis-isobutyronitrile | 0.4 |
| Ethylenediamine tetraacetic acid (Versene) | 0.05 |
| Sodium salts of polymerized alkylnaphthalene sulfonic acids (Daxad-11) | 0.1 |
| Antifoaming agent (Dow FG-10) | <0.04 |
| Water | 200 |

The final pH of the reaction mixture was 9.5 and the total solids after completion of the reaction was 30.0%.

B. Preparation of Graft Polymer

A graft resin was prepared utilizing the above elastomer by reacting the following components at 57°C over a period of 3.1 hours.

| Components | Parts by Weight |
|---|---|
| Acrylonitrile | 75 |
| Methyl acrylate | 25 |
| Elastomer solids (obtained from (A) above) | 9 |
| Sodium salt of dioctyl sulfosuccinate | 1.21 |
| Polyvinylpyrrolidone | 0.3 |
| Pentaerythritol tetrakis (mercaptopropionate) (chain transfer agent) | 1.55 |
| Potassium persulfate | 0.06 |
| Antifoam (Dow FG-10) | <.04 |
| Water | 230 |

All of the above materials were added initially to the reactor with agitation with the exception of the chain transfer agent, which was added 20 minutes after the start of the reaction. Completion of the reaction was determined on the basis of total solids of 28% and a conversion of 85%. The latex was coagulated in methanol with aqueous aluminum sulfate, filtered and dried.

The various organotin stabilizers were added to the dried powders of the polymers described in Examples A through D in the amounts of from 0.5 to 1.0 parts by weight per hundred parts of resin, as indicated in Table I. These resin compositions were then evaluated for their color stability and optical properties by a method based on the use of a Brabender Plasticorder. The method was designed to enable the prediction of the optical properties such as haze, color, and light transmission resulting from processing various resin batches into fabricated articles. It was found that five to seven minute residence time in the Brabender at 200°C is equivalent to the total heat history that the resin would encounter during processing.

The instrument used consisted of a dynamometer, Type PL-U33AA (No. 2162-64), and its accompanying roller style measuring head (No. A-30/S.B.). The roller style measuring head was electrically heated and was equipped with a Rosemont temperature controller Fifty-gram samples were screened in the Brabender se for a temperature of 200°C and 35 rpm. Four samples approximately 1.5 g in weight were removed at 3-minute intervals from the Brabender for optical measurements. The initial sample was taken 4 minutes after the start of sample loading. Torque values and temperature were also noted at the 4-minute mark. Discs having a uniform thickness of 40 mils were prepared for optional measurements by pressing the fused polymer under mild conditions. The conditions selected for the pressing of discs from Brabendered samples did not contribute significantly to measured optical values. The disc was prepared by placing a mold 40 mils thick and 1¼ inches diameter in a press between two parallel mirror-finished, chrome-plated brass platens, one-eighth inch thick. The platens were heated to 154°C. A 1.5 g sample of the cooled resin removed at the various times from the Brabender was placed in each of the four cavities of the mold or in two cavities diagonally across from one another if only two discs were being processed. The heated plates containing the resin and the mold therebetween were positioned in the press so that the melt samples were pressed between the two highly polished surfaces. Fifteen thousand pounds ram pressure was applied and held for 5 to 10 seconds. The pressure was then released and the entire unit transferred to a cold press where 20,000 lbs. ram pressure was applied. After approximately 30 seconds the plates were sufficiently cool to handle. The unit was then removed and the discs were removed from the cavities. The percent light transmission was measured with the HunterLab Colormeter and the yellowness index and percent haze were determined by ASTM Standard Methods D 1925-70 and D 1003-61, respectively.

It is apparent from the examples shown in Table I that the hydrocarbon-tin maleate compounds of the present invention are unique among the organotin compounds tested for the stabilization of nitrile-containing polymers against color degradation. Although the other organotin compounds shown in the table are known to be effective color stabilizers for polyvinyl chloride, these compounds actually increase the color formation of the nitrile resins and only the organotin maleates of the present invention were found to be effective for the color stabilization of nitrile resins.

Table I

| Example | Resin | Stabilizer | Additive Conc. PHR (wt.) | Yellowness Index 4 min. | 7 min. | 10 min. | 13 min. | Percent Haze 4 min. | 7 min. | 10 min. | 13 min. |
|---|---|---|---|---|---|---|---|---|---|---|---|
| 1 | A | None | 0.0 | 9.8 | 16.2 | 27.2 | 41.2 | 11.2 | 7.0 | 12.0 | 9.7 |
| 2 | A | Di-n-octyltin maleate polymer | 0.5 | 10.3 | 14.9 | 20.9 | 28.9 | 7.0 | 7.3 | 8.0 | 7.7 |
| 3 | A | Organotin carboxylate (Advastab T-290 Cinn. Millicron) | 0.5 | 16.3 | 26.2 | 38.4 | 50.3 | 6.4 | 6.8 | 6.0 | 5.7 |
| 4 | A | Dibutyltin S,S'-bis mercaptopropionate | 0.5 | 15.7 | 36.3 | 54.1 | 66.7 | 11.7 | 7.2 | 9.8 | 6.8 |
| 5 | B | None | 0 | 26.6 | 70.6 | 89.7 | 100.7 | 4.7 | 6.0 | 9.0 | 8.5 |
| 6 | B | Di-n-octyltin maleate polymer | 0.5 | 16.8 | 32.0 | 46.4 | 68.1 | 5.1 | 5.5 | 5.2 | 7.0 |
| 7 | B | Dibutyltin S,S'-bis (lauryl mercaptide) | 0.5 | 32.4 | 73.5 | 91.8 | 100.7 | 8.7 | 7.7 | 6.5 | 7.1 |
| 8 | B | None | 0.5 | 23.8 | 59.5 | 82.9 | 93.6 | 3.9 | 6.2 | 6.6 | 8.8 |
| 9 | B | Di-n-octyltin maleate polymer | 0.5 | 16.5 | 26.0 | 38.3 | 54.7 | 6.6 | 5.8 | 5.7 | 10.0 |
| 10 | B | Dibutyltin maleate | 0.5 | 26.6 | 44.0 | 68.8 | 88.3 | 7.2 | 5.5 | 9.5 | 6.8 |
| 11 | B | Decyl half ester of dibutyltin-bis-maleate (Thermolite 25, M & T Chemicals Inc.) | 0.5 | 23.0 | 37.9 | 55.2 | 72.2 | 5.4 | 4.2 | 4.2 | 4.8 |
| 12 | B | Decyl half ester of dibutyltin maleate + 2,6-ditert-butyl-p-cresol (9:1 wt. ratio) (Thermolite 42, M & T Chemicals, Inc.) | 0.5 | 20.6 | 35.1 | 47.9 | 63.4 | 5.0 | 5.5 | 3.9 | 4.3 |
| 13 | B | Dibutyltin-bis-carboxylate (Thermolite 12, M & T Chemicals Inc.) | 0.5 | 36.1 | 72.9 | 88.3 | 99.5 | 17.3 | 17.6 | 16.4 | 18.6 |
| 14 | B | Dibutyltin-bis-mercapto ester (Thermolite 31, M & T Chemicals Inc.) | 0.5 | 28.4 | 60.6 | 80.9 | 92.9 | 2.8 | 2.7 | 3.3 | 3.6 |
| 15 | B | Dibutyltin mercapto acid Thermolite 35, M & T Chemicals Inc.) | 0.5 | 38.0 | 73.0 | 88.0 | 98.1 | 8.5 | 4.5 | 3.8 | 4.3 |
| 16 | B | Dimethyltin-bis-mercapto ester (Thermolite 106, M & T Chemicals, Inc.) | 0.5 | 28.4 | 64.4 | 84.5 | 97.6 | 2.1 | 2.9 | 5.5 | |
| 17 | B | Tetrabutyltin | 0.5 | 22.4 | 52.0 | 74.1 | 87.3 | 9.0 | 9.0 | 9.3 | 8.1 |
| 18 | B | Stannous octoate | 0.5 | 31.8 | 59.5 | 79.3 | 90.3 | 7.5 | 6.8 | 8.0 | 9.4 |
| 19 | B | Monobutyltin-tris-mercapto-ester (Dm-8783) | 0.5 | 17.3 | 54.1 | 83.3 | 97.8 | 2.2 | 2.4 | 3.0 | 6.4 |
| 20 | C | None | — | 10.9 | 35.7 | 55.4 | 70.2 | | | | |
| 21 | C | Di-n-octyltin maleate polymer | 1.0 | 9.3 | 11.2 | 15.4 | 19.8 | | | | |
| 22 | D | None | — | 21.9 | 31.2 | 39.7 | 46.0 | | | | |
| 23 | D | Di-n-octyltin maleate polymer | 0.5 | 18.4 | 26.2 | 33.7 | 41.8 | | | | |

We claim:

1. A polymer composition stable toward thermal discoloration containing from about 0.05 to 2.0 parts by weight of an organotin maleate compound per hundred parts of resin, wherein said organotin maleate is selected from the group consisting of the dialkyltin maleates having the formula:

$$(R_2SnC_4H_2O_4)_x$$

where $x$ is an integer of from 1 to 4, and R is an alkyl group containing from 2 to 12 carbon atoms, and the dialkyltin-bis-maleate half esters having the formula:

$$R_2Sn(C_4H_2O_4R')_2$$

where R is defined as above and R' is an alkyl group containing from 4 to 14 carbon atoms,
and wherein said polymer is a copolymer composed of 100 parts by weight of:
A. at least 50% by weight of at least one nitrile having the structure $$CH_2=C-CN$$
$$|$$
$$R$$

wherein R is hydrogen, a lower alkyl group having from 1 to 4 carbon atoms, or a halogen, and
B. up to 50% by weight based on the combined weight of (A) and (B) of at least one member selected from the group consisting of:
1. styrene,
2. an ester having the structure $$CH_2=C-COOR_2$$
$$|$$
$$R_1$$

wherein $R_1$ is hydrogen, an alkyl group having from 1 to 4 carbon atoms, or a halogen, and $R_2$ is an alkyl group having from 1 to 6 carbon atoms,
3. an alpha-olefin having the structure $$CH_2=C\begin{matrix}R'\\R''\end{matrix}$$

wherein R' and R'' are alkyl groups having from 1 to 7 carbon atoms,
4. a vinyl ether selected from the group consisting of methyl vinyl ether, ethyl vinyl ether, the propyl vinyl ethers, and the butyl vinyl ethers, and
5. vinyl acetate, and
wherein said monomers are copolymerized in the presence of from 0 to 40 parts by weight of:
C. a rubbery polymer of a conjugated diene monomer selected from the group consisting of butadiene and isoprene and optionally a comonomer selected from the group consisting of styrene and a nitrile monomer having the structure $$CH_2=C-CN$$
$$|$$
$$R$$

wherein R has the above designation, said rubbery polymer containing from 50 to 100% by weight of polymerized conjugated diene and from 0 to 50% by weight of comonomer.

2. The polymer composition in claim 1 wherein the organotin maleate compound is di(n-octyl)tin maleate polymer, having the formula: $[(C_8H_{17})_2SnC_4H_2O_4]_x$ wherein $x$ is an integer of from 2 to 4.

3. The polymer composition in claim 1 wherein the organotin maleate compound is dibutyl tin maleate, $(C_4H_9)_2SnC_4H_2O_4$.

4. The polymer composition in claim 1 wherein the organotin maleate is the decyl half ester of dibutyltin-bis-maleate, $(C_4H_9)_2Sn(C_4H_2O_4 C_{10}H_{21})_2$.

5. The composition in claim 1 which also contains from about 0.05 to 2 parts by weight per hundred parts of resin of an anti-oxidant selected from the group consisting of alkyl substituted phenols, alkyl esters of thioacids, alkyl substituted phenyl phosphites and alkyl substituted phenyl phosphates.

6. The polymer composition of claim 1 wherein the component (A) is present in amounts of from about 70 to 90% by weight based on the combined weight of (A) and (B); component (B) is correspondingly present in amounts of from about 30 to 10% by weight based on the combined weight of (A) and (B), and the organotin maleate compound is present in concentrations of from about 0.1 to 1.0 parts by weight per hundred parts of resin.

7. The composition of claim 6 wherein the component (A) is a member selected from the group consisting of acrylonitrile and methacrylonitrile.

8. The composition of claim 7 wherein the component (B) is styrene.

9. The composition of claim 7 wherein component (B) is a member selected from the group consisting of methyl acrylate, ethyl acrylate, methyl methacrylate, and ethyl methacrylate.

10. A method for stabilizing a polymer composition against thermal discoloration during processing, comprising adding from about 0.05 to 2.0 parts by weight of an organotin maleate compound per hundred parts of polymer wherein said organotin maleate is selected from the group consisting of the dialkyltin maleates having the formula:

$$(R_2SnC_4H_2O_4)_x$$

where $x$ is an integer of from 1 to 4, and R is an alkyl group containing from 2 to 12 carbon atoms, and the dialkyltin-bis-maleate half esters having the formula:

$$(R_2Sn(C_4H_2O_4R')_2$$

where R is defined as above and R' is an alkyl group containing from 4 to 14 carbon atoms,
wherein the polymer is a copolymer obtained by polymerizing 100 parts by weight of:
A. at least 50% by weight of at least one nitrile having the structure $$CH_2=C-CN$$
$$|$$
$$R$$

wherein R is hydrogen, a lower alkyl group having from 1 to 4 carbon atoms, or a halogen, and
B. up to 50% by weight based on the combined weight of (A) and (B) of at least one member selected from the group consisting of 1. styrene,
2. an ester having the structure

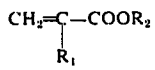

wherein $R_1$ is hydrogen, an alkyl group having from 1 to 4 carbon atoms, or a halogen, and $R_2$ is an alkyl group having from 1 to 6 carbon atoms,
3. an alpha-olefin having the structure

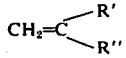

wherein $R'$ and $R''$ are alkyl groups having from 1 to 7 carbon atoms,
4. a vinyl ether selected from the group consisting of methyl vinyl ether, ethyl vinyl ether, the propyl vinyl ethers, and the butyl vinyl ethers,
5. vinyl acetate, and wherein said monomers are copolymerized in the presence of from 0 to 40 parts by weight of:

C. a rubbery polymer of a conjugated diene monomer selected from the group consisting of butadiene and isoprene and optionally a comonomer selected from the group consisting of styrene and a nitrile monomer having the structure

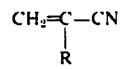

wherein R has the above designation, said rubbery polymer containing from 50 to 100% by weight of polymerized conjugated diene and from 0 to 50% by weight of comonomer.

11. The method of claim 10 wherein the polymer is obtained by polymerizing from about 70 to 90% by weight of component (A) based on the combined weight of (A) and (B) and correspondingly from about 30 to 10% by weight of component (B) based on the combined weight of (A) and (B); and wherein the organotin maleate compound is included in said polymer composition in concentrations of from about 0.1 to 1.0 parts by weight per hundred parts of resin.

12. The method of claim 10 wherein component (A) is a member selected from the group consisting of acrylonitrile and methacrylonitrile.

13. The method of claim 12 wherein component (B) is styrene.

14. The method of claim 12 wherein component (B) is a member selected from the group consisting of methyl acrylate, ethyl acrylate, methyl methacrylate, and ethyl methacrylate.

* * * * *

UNITED STATES PATENT OFFICE
CERTIFICATE OF CORRECTION

Patent No. 3,907,932　　　　　　　　　　Dated September 23, 1975

Inventor(s) Alice W. Kennedy et al

It is certified that error appears in the above-identified patent and that said Letters Patent are hereby corrected as shown below:

Column 9 and 10 under Table I

Example 16 "2.9" under Percent Haze 7 min. should be

--2.4--

"　　" "5.5" under Percent Haze 10 min. should be

--2.9--

"　　" Under Percent Haze 13, min. "blank space"

should be --5.5--

Example 17 "22.4" under Yellowness Index 4 min. should be

--22.2--

Column 11:　Line 23, "$Ch_2$" should be --$CH_2$--

Signed and Sealed this ninth Day of August 1977

[SEAL]

Attest:

RUTH C. MASON　　　　　　　　C. MARSHALL DANN
　　　　Attesting Officer　　　　　Commissioner of Patents and Trademarks